United States Patent [19]

Strong, Jr. et al.

[11] Patent Number: 5,029,209
[45] Date of Patent: Jul. 2, 1991

[54] PSEUDORANDOM, ITERATIVE METHOD AND APPARATUS FOR AUTOMATICALLY CREATING ADDRESSES

[75] Inventors: Fredrick S. Strong, Jr., Lynnwood; Michael R. Dabb, Puyallup, both of Wash.

[73] Assignee: The Boeing Company, Seattle, Wash.

[21] Appl. No.: 537,435

[22] Filed: Jun. 13, 1990

[51] Int. Cl.[5] .......................... H04K 1/00; H04Q 3/00
[52] U.S. Cl. ...................................... 380/25; 364/200; 340/825.5; 340/825.52; 380/46
[58] Field of Search ..................... 380/25, 46; 364/200, 364/284.3, 284.4, 241; 340/825.5, 825.51, 825.52, 825.53

[56] References Cited

U.S. PATENT DOCUMENTS

| | | | |
|---|---|---|---|
| 3,787,627 | 1/1974 | Abramson et al. | 179/15 |
| 4,161,634 | 7/1979 | Bellisio | 179/175.31 |
| 4,251,880 | 2/1982 | Baugh et al. | 370/80 |
| 4,360,870 | 11/1982 | McVey | 364/200 |
| 4,423,414 | 12/1983 | Bryant et al. | 340/825.52 |
| 4,468,729 | 8/1984 | Schwartz | 364/200 |
| 4,529,980 | 7/1985 | Liotine et al. | 340/825.52 |
| 4,563,774 | 1/1986 | Gloge | 340/825.5 |
| 4,595,921 | 6/1986 | Wang et al. | 340/825.08 |
| 4,622,631 | 11/1986 | Frank et al. | 364/200 |
| 4,628,311 | 12/1986 | Milling | 340/825.5 |
| 4,628,503 | 12/1986 | Grams et al. | 340/825.5 |
| 4,638,313 | 1/1987 | Sherwood, Jr. et al. | 340/825.52 |
| 4,661,902 | 4/1987 | Hochsprung et al. | 364/200 |
| 4,680,583 | 7/1987 | Grover | 340/825.5 |
| 4,727,475 | 2/1988 | Kiremidjian | 364/200 |
| 4,750,168 | 6/1988 | Trevitt | 370/85 |
| 4,761,646 | 8/1988 | Choquet et al. | 340/825.52 |

OTHER PUBLICATIONS

J. F. Brennen, "Synchronous Priority Selection", *IBM Technical Disclosure Bulletin*, vol. 21, No. 12, May 1979, pp. 4937-4941.

*Primary Examiner*—Thomas H. Tarcza
*Assistant Examiner*—David Cain
*Attorney, Agent, or Firm*—Christensen, O'Connor, Johnson & Kindness

[57] ABSTRACT

A pseudorandom, iterative method and apparatus for automatically creating an address for each remote unit of a data communication network comprising a plurality of remote units, such as the seat electronic units (17) of a passenger aircraft, and a central unit, such as a central transmitter/receiver unit (13). The formats of the message frames that control the flow of data between the central unit and the plurality of remote units includes a synchronization word, a command word, and a series of data word segments. The number of data word segments is equal to or greater than the number of remote units. The pseudorandom, iterative method and apparatus assigns addresses such that one and only one remote unit is associated with a data word segment position. First, the central unit transmits an ADDRESS ASSIGN PHASE 1 command to each remote unit. In response, each remote unit randomly selects a data word segment position and replies to the central unit in the selected position. Next, the central unit transmits an ADDRESS ASSIGN PHASE 2 command. All of the remote units that replied in the first data word segment position that contained a reply respond to the ADDRESS ASSIGN PHASE 2 command. All other remote units are locked out. The responding remote units randomly select another data word segment position and respond to the central unit in the selected position. The central unit retransmits an ADDRESS ASSIGN PHASE 2 command. All of the remote units that responded, in the first data word segment position that contained a response, reply to the ADDRESS ASSIGN PHASE 2 retransmission. All of the remote units that responded in other positions are locked out. The transmission of ADDRESS ASSIGN PHASE 2 commands is repeated for N cycles. Alternatively, the process can be repeated until the remote unit response is found to be error-free, which indicates that the response was produced by a single remote unit. In either case, after completion of the ADDRESS ASSIGN PHASE 2 command transmissions, the central unit transmits an ADDRESS ASSIGN PHASE 3 command, which instructs the single responding remote unit to assign itself a unique address and, then, lock itself out of the iterative process. Thereafter, the entire process is repeated until no further responses are received to an ADDRESS ASSIGN PHASE 1 command.

16 Claims, 9 Drawing Sheets

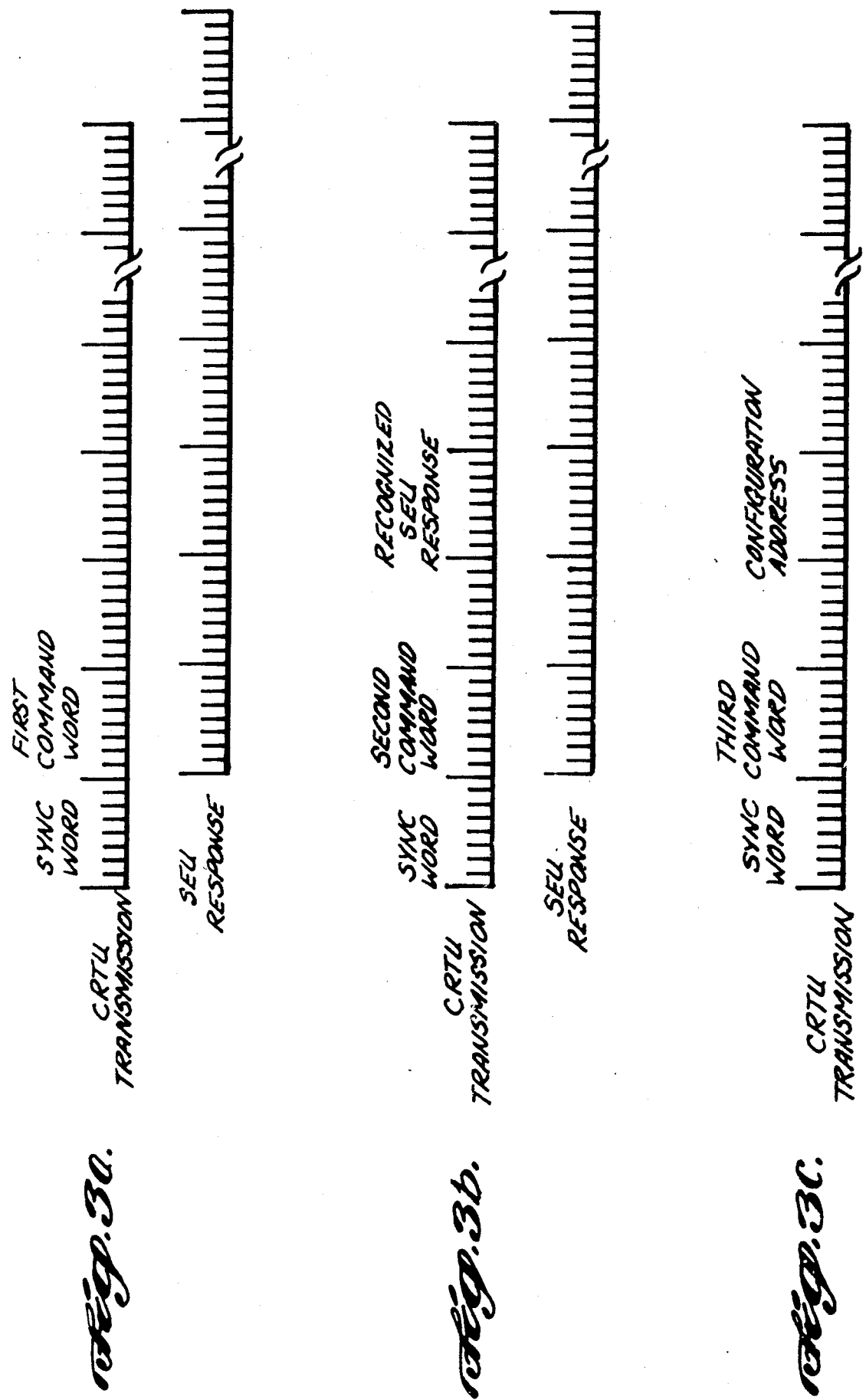

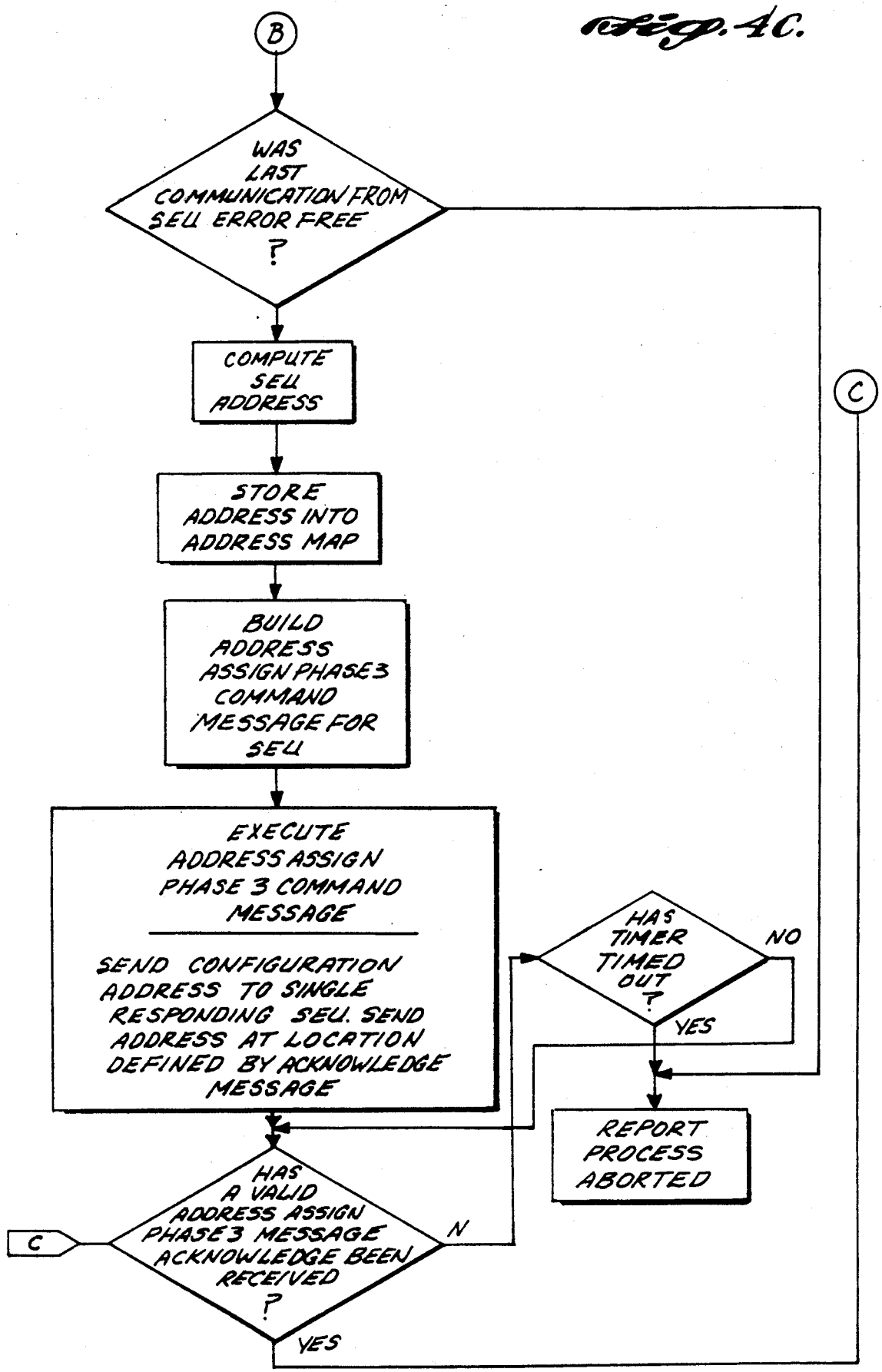

PSEUDORANDOM, ITERATIVE METHOD AND APPARATUS FOR AUTOMATICALLY CREATING ADDRESSES

TECHNICAL AREA

This invention relates to data communication networks and, more particularly, to methods and apparatus for assigning addresses to each of the remote units of a data communication network comprising a plurality of remote units and a main unit.

BACKGROUND OF THE INVENTION

While the present invention was designed for use in connection with a data communication network of the type that communicates between the seat electronic units (SEUs) that service the passenger seats of a commercial aircraft and a central receiver transmitter unit (CRTU), as will be readily appreciated from the following description, the invention has wider applicability. It is useful in other data communication networks comprising a plurality of remote units and a central unit. One example of such a network is a personal computer network that couples a plurality of low-capability personal computers to a high-capability personal computer that functions as a file server and controller of data flow between the low-capability personal computers.

When ordering commercial aircraft, airline companies often specify a number of design options to the manufacturer, including passenger seating layouts. The manufacturing and inventory costs associated with providing different seating arrangements and spacing between seats can be significant. The costs will become more important to the next generation of aircraft, which will offer new personal entertainment and service facilities to each passenger. Designers of such facilities are planning to install an entertainment system and passenger service system in the back of each aircraft seat for use by the passenger in the following seat. Communication between a central receiver/transmitter and the passenger seats will be via a common data bus. Communication between the central receiver/transmitter unit and the seat electronic units servicing the passenger seats will require a message frame having data word segments at least equal in number to the number of seat electronic units. In addition, each seat electronic unit will have to be assigned a specific data word segment. While such an assignment could be easily accomplished using prior art techniques if passenger seats and their associated seat electronic units remain fixed during the life of the aircraft, fixed seats inhibit the ability to rearrange classes of seating (by sliding seats to change seating pitch) in order to optimize the payload return on a flight (even within 30 minutes of departure). The ability to rearrange classes of seating on a short-term basis is a profitable feature that is desired by most airlines. As a result, there exists a need for a more sophisticated method and apparatus for automatically assigning addresses to each of the seat electronic units of an aircraft that are compatible with the ability to rearrange seating on a short-term basis. The present invention is directed to meeting this need.

SUMMARY OF THE INVENTION

In accordance with this invention, a pseudorandom, iterative method and apparatus for automatically creating an address for each remote unit of a data communication network comprising a plurality of remote units, such as the seat electronic units of a passenger aircraft, and a central unit, such as a central transmitter/receiver unit. The format of the message frames that control the flow of data between the central unit and the plurality of remote units includes a series of data word segments equal to or greater than the number of remote units, plus a command word and any other required words, such as a synchronization word. The pseudorandom, iterative method and apparatus assigns addresses such that one and only one remote unit is associated with a data word segment. First, the central unit transmits a first command that enables each remote unit to randomly select a data word segment and respond to the central unit in the selected segment. Next the central unit transmits a second command that causes a response from all of the remote units that responded to the first command in the first segment containing response data. All remote units that responded to the first command in other (later) segments are locked out. Remote units that respond to the second command randomly select a data word segment and respond in the selected segment. The central unit repeats the second command, which causes a response from all of the remote units that responded in the first segment containing response data. All of the remote units that responded in later segments are locked out. The second command and the locking out of later responding remote units is repeated for a predetermined number of cycles. Alternatively, the second command is repeated until the first detected response data is found to be error free, which indicates that the data has been produced by a single remote unit. After the second command repetitions have been completed, the central unit transmits a third command that causes the single responding remote unit to assign itself to an address and, then, lock itself out of the iterative process. Thereafter, the entire process is repeated until no further responses are received to the first command.

As will be appreciated from the foregoing summary, the method and apparatus of the invention rapidly and quickly assign a data word segment to each specific remote unit. If desired, after the assignment has been completed, the message frame could be compressed to eliminate unused data word segments. Such a procedure may be desirable in situations where the number of remote units can vary over a wide range. In any event, the invention provides for the rapid reassignment of addresses each time the number of remote units is changed or the remote units are rearranged in a different manner. As a result, the invention is ideally suited for use in the passenger compartment of an aircraft to create addresses for the seat electronic units of passenger seats whose position is frequently changed. The invention is also ideally suited for use with other types of data communication networks such as PC networks and networks containing CPUs dedicated to controlling specific processes, such as manufacturing control networks.

BRIEF DESCRIPTION OF THE DRAWINGS

The foregoing and other features and advantages of this invention will become more readily appreciated as the same becomes better understood by reference to the following detailed description when taken in conjunction with the accompanying drawings wherein:

FIGS. 3A-C illustrate the relationship between central unit transmissions and remote unit responses when addresses are automatically being assigned or created in accordance with the invention;

FIGS. 4A-C form a flow diagram illustrating the operation of the main unit illustrated in FIG. 1.

DESCRIPTION OF THE PREFERRED EMBODIMENT

As noted above, while the present invention was designed for use in connection with the passenger entertainment and communication system used in the passenger cabin of an aircraft, it is also utilizable with other types of networks that require communication between a central unit and a plurality of remote units coupled to the central unit via a common data bus or some other communication media.

Figure 1:
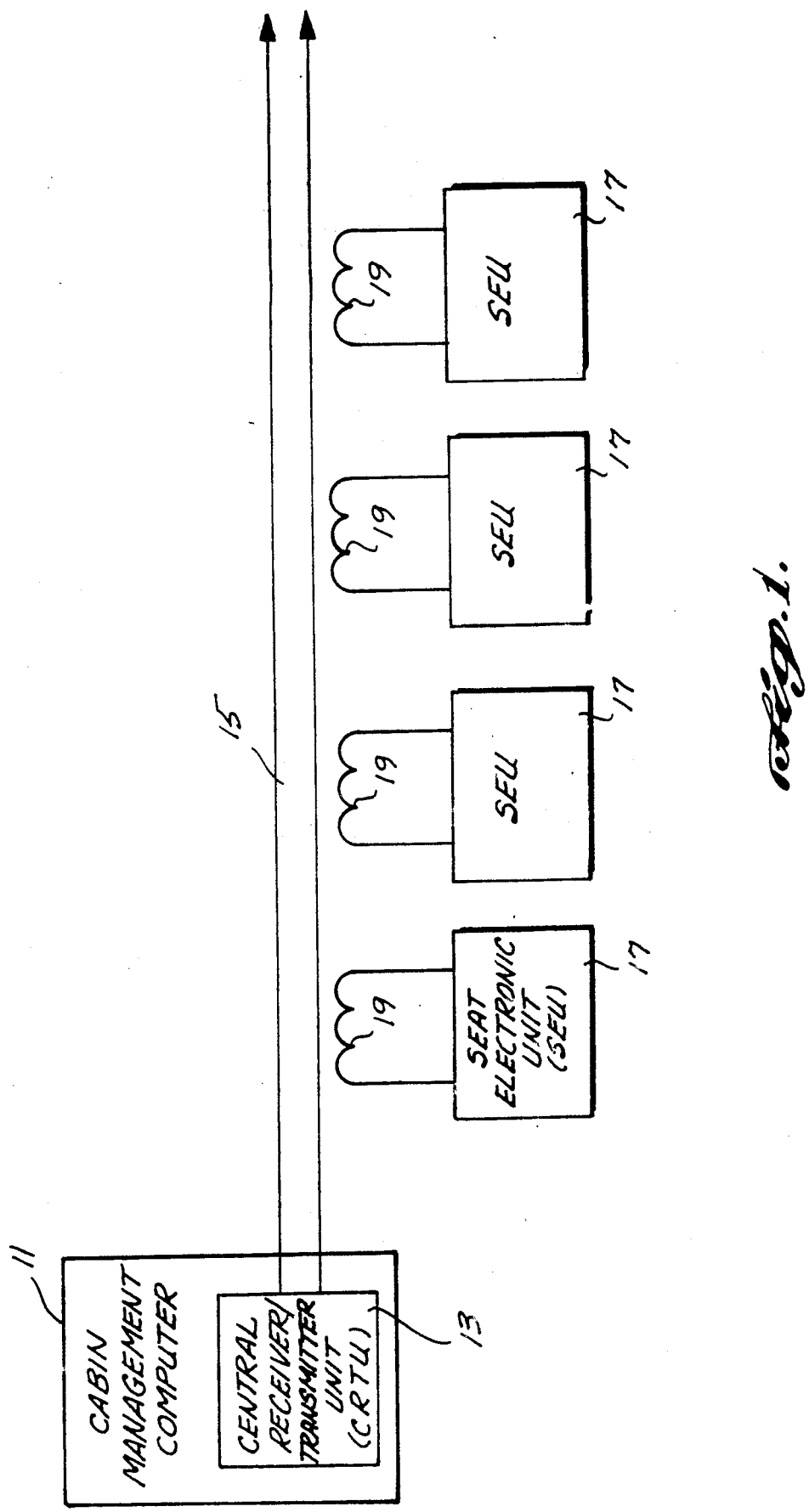
FIG. 1 is a block diagram illustrating an entertainment and communication system suitable for use in passenger aircraft incorporating the invention.

The central unit illustrated in FIG. 1 is a cabin management computer 11 that includes a central receiver/transmitter unit (CRTU) 13. The CRTU is connected to one end of a data bus 15 to which a plurality of seat electronic units (SEUs) 17 are inductively coupled via coupling windings 19. The SEUs form the remote units of the system. Efficient communication between the CRTU and the SEUs requires the time division multiplexing of the data flow therebetween. Time division multiplexing requires that each of the SEUs be assigned a particular data word segment in a time division multiplexed message frame that defines the communication protocol between the CRTU and the SEUs. By assigning each SEU a particular data word segment or time position in a message frame, each SEU knows when to "look" for data transmitted to it by the CRTU and, time-wise, when to apply data to the data bus for transmission to the CRTU.

Figure 2:
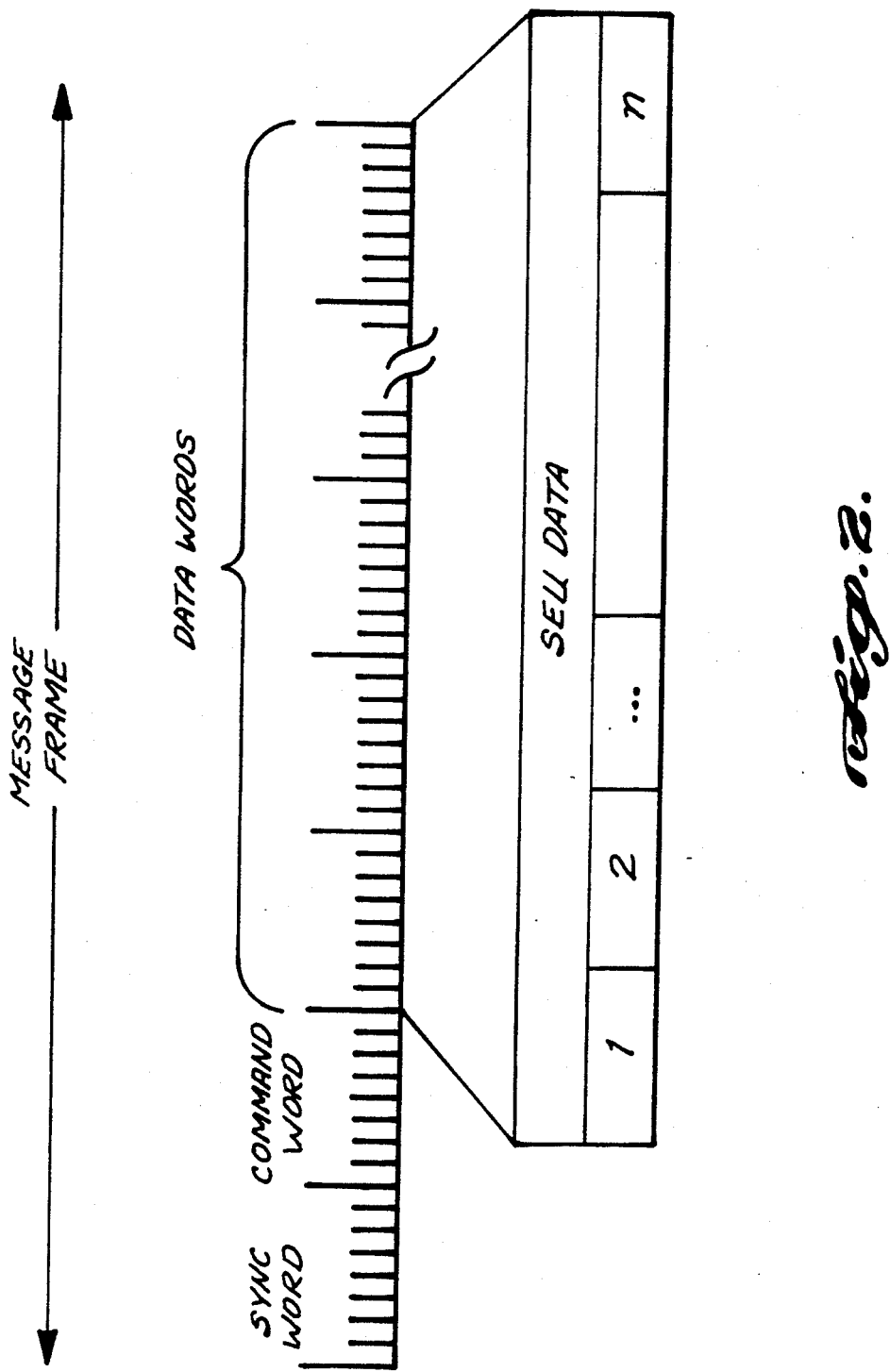
FIG. 2 illustrates the preferred format of a data message frame used by the system illustrated in FIG. 1.

FIG. 2 is a diagram that illustrates the presently preferred CRTU-SEU message frame format. As will be readily appreciated by those skilled in the data communication art, the message frame depicted in FIG. 2 has an SDLC/HDLC-type format. The message frame comprises a synchronization (sync) word followed by a command word. The remainder of the frame comprises a predetermined number of equal length data word segments. The method and apparatus of the invention assigns a data word segment to each SEU so that the CRTU and SEUs can communicate with one another. That is, each SEU "address" is defined by a dedicated position in the message frame.

FIGS. 3A-C illustrate in message frame form how the SEU addresses are assigned. FIGS. 4A-C and 5A-C illustrate how the CRTU and SEUs are programmed to carry out the sequence of steps illustrated in FIGS. 3A-C.

As illustrated in FIG. 3A, the first step in the sequence is for the CRTU 13 to transmit a message frame, i.e., apply a message frame to the bus 15. The transmitted message frame comprises the sync word and a first command word identified herein as an ADDRESS ASSIGN PHASE 1 command. In response to the CRTU transmission of an ADDRESS ASSIGN PHASE 1 command, each of the SEUs 17 guesses, i.e., randomly selects, a data word segment and responds to the CRTU 13 in the selected segment. The CRTU 13 monitors activity on the bus 15 and, in response to the receipt of data from an SEU 17, initiates a second transmission. FIG. 3B also illustrates that the second CRTU transmission comprises the sync word followed by a second command word hereinafter denoted an ADDRESS ASSIGN PHASE 2 command. The ADDRESS ASSIGN PHASE 2 command identifies which data word segment contained the first response message received by the CRTU 13. In an exemplary manner, FIG. 3B shows that the first recognized SEU response occurred in the second data word segment. The ADDRESS ASSIGN PHASE 2 command enables all of the SEUs responding in the recognized SEU response segment, i.e., the second data word segment, to randomly guess another segment and to respond back to the CRTU 13 in the selected segment. All of the SEUs 17 that did not respond in the recognized SEU response segment, i.e., the second data word segment, are locked out of the process.

The CRTU again monitors activity on the bus 15 and, in response to the receipt of data from an SEU 17, indicates a third transmission in the form of a second ADDRESS ASSIGN PHASE 2 command. The second ADDRESS ASSIGN PHASE 2 command identifies which segment contained the response to the first ADDRESS ASSIGN PHASE 2 command. The second ADDRESS ASSIGN PHASE 2 command enables all of the SEUs 17 responding in the first segment that contained a response to the first ADDRESS ASSIGN PHASE 2 command to respond to the second ADDRESS ASSIGN PHASE 2 command. All of the other SEUs 17 that responded to the first ADDRESS ASSIGN PHASE 2 command are locked out. This sequence of steps is repeated N times. The value of N can be determined in either of two manners. It can be a predetermined (fixed) value, based on the number of SEUs to be assigned to data word segments. In one actual embodiment of the invention N was set equal to 3. Alternatively, N can have a variable value. Each time the sequence occurs, the data word received in the first response segment can be tested to determine if it is valid. A response by a single SEU in a data word segment will be valid, whereas responses by several SEUs in the same data word segment will create confusion and, thus, be invalid. In this case, N equals the number of ADDRESS ASSIGN PHASE 2 command repetitions that occur before a valid response is received.

After the ADDRESS ASSIGN PHASE 2 command has been repeated an adequate number of times (i.e., N times), as illustrated in FIG. 3C, the CRTU transmits a message frame that includes a third command word, hereinafter denoted an ADDRESS ASSIGN PHASE 3 command. This is followed by a configuration address located in the data word segment associated with the single responding SEU 17. When the related SEU 17 receives the configuration address, it configures itself, i.e., sets its address, to the position of the data word segment defined by the configuration address and, then, locks itself out of the process. While the configuration address could be the same as the address of the data word segment, the configuration address can be the address of any other data word segment. Or, if the data communication protocol of a system incorporating the invention is based on addresses rather than time, the configuration address may be the next one in a sequence of addresses that uniquely identify the SEUs as opposed to data word segment positions. In any event, after the SEU is locked out, the entire process is repeated, i.e., the CRTU 13 transmits a message frame that includes an ADDRESS ASSIGN PHASE 1 command followed by a message frame that includes an ADDRESS ASSIGN PHASE 2 command. After N ADDRESS ASSIGN PHASE 2 command transmission iterations have occurred, the CRTU 13 transmits a message frame containing an ADDRESS ASSIGN PHASE 3 command. The process terminates when no response is received to an ADDRESS ASSIGN PHASE 1 command.

As will be appreciated from the foregoing description, the present invention includes a method of assigning or creating a specific address in the form of a data word segment position for each SEU 17. As will be better understood from the following description, the assignment or creation is accomplishable automatically, i.e., without operator support. In addition to being useful in aircraft cabins to assign addresses to SEUs 17 associated with the CRTU 13 of a cabin management computer 11, the invention is also useful in other networked data communication systems. The invention is independent of message format and input/output address configuration.

Figure 4A:
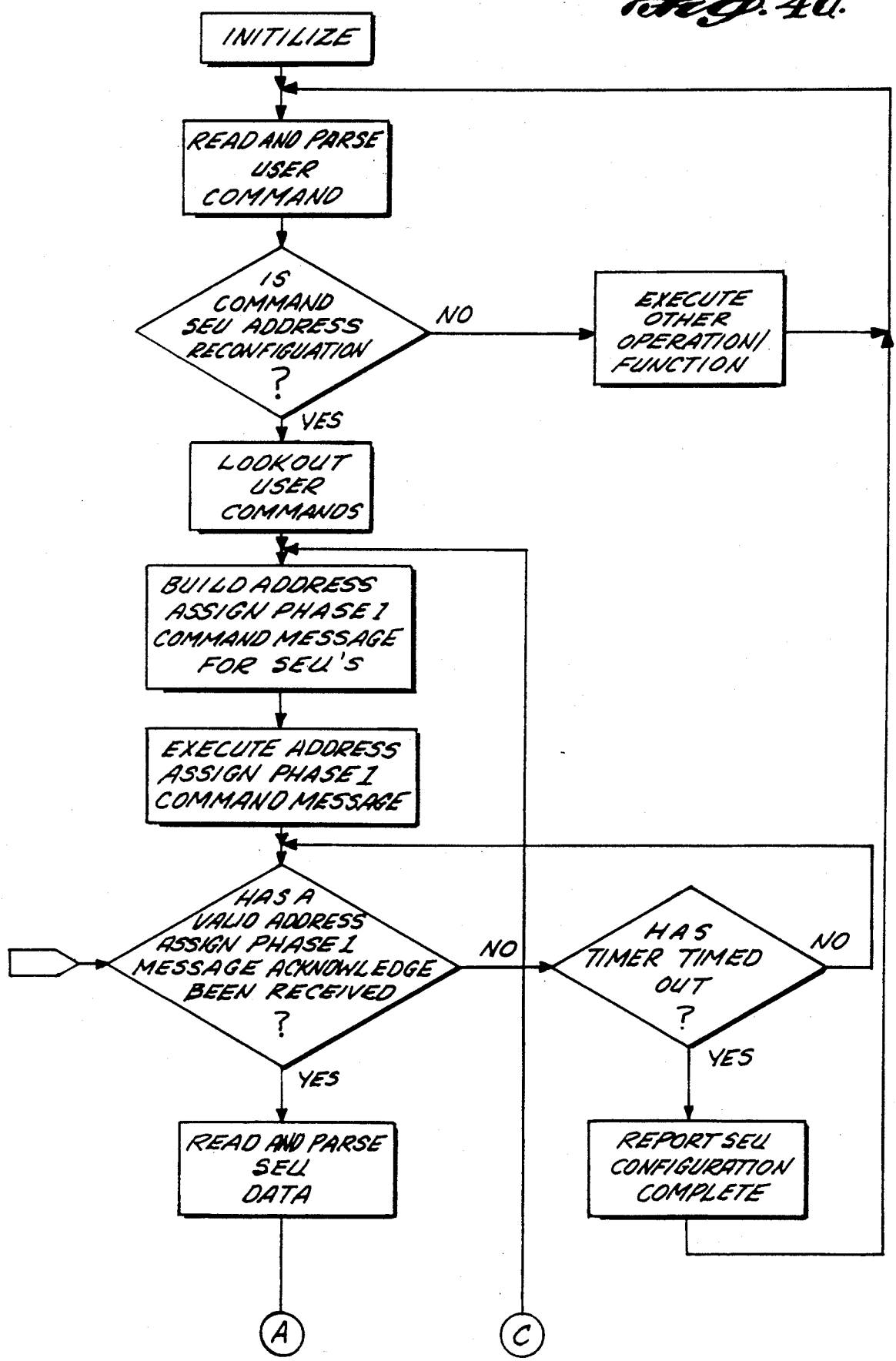
Figure 4B:
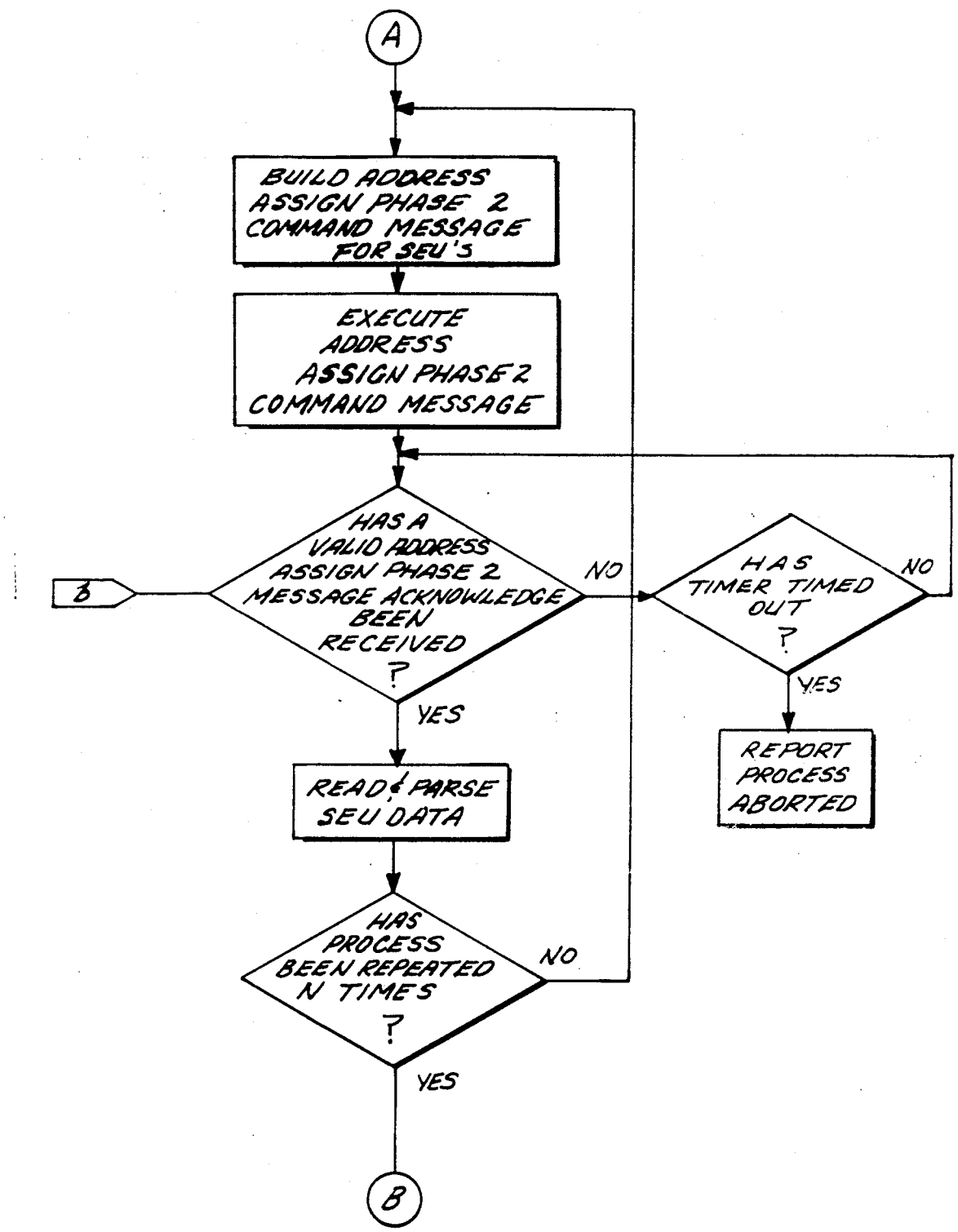

FIGS. 4A–C comprise a flow diagram illustrating the presently preferred way of programming a CRTU 13 to carry out the method of the invention. As shown in FIG. 4A, after initialization, user commands are read and parsed in a conventional manner. User commands can be inputted in any conventional manner, at any point in time. In the case of the system illustrated in FIG. 1, the user commands could be entered by aircraft technicians via the cabin management computer keyboard. Alternatively, user commands can occur automatically, based on some other criteria, i.e., landing, take-off, cruise altitude, etc. The user commands may be related or unrelated to the present invention. A suitable command related to the present invention could be labeled SEU ADDRESS RECONFIGURATION command. It could be entered by an aircraft technician hitting a function key associated with a menu after the seats of an aircraft have been rearranged.

After being read and parsed, user commands are tested to determine if an SEU address configuration is to occur, i.e., if the command is SEU ADDRESS RECONFIGURATION. If an SEU address reconfiguration is not being commanded, whatever operation or function (unrelated to this invention) is being commanded is executed. Thereafter, the program cycles back to the read and parse user command step.

If the user command is an SEU ADDRESS RECONFIGURATION command, subsequent user commands are locked out, i.e., the CRTU is prevented from recognizing subsequently occurring user commands until the steps described below are completed.

Next, the CRTU 13 builds a message for the SEUs 17 that contains the ADDRESS ASSIGN PHASE 1 command. After the ADDRESS ASSIGN PHASE 1 command message has been built (i.e., created), as illustrated in the next block of FIG. 4A, the ADDRESS ASSIGN PHASE 1 command message is executed, i.e., transmitted via the bus 15 to all the SEUs 17. Thereafter, the CRTU 13 idles, i.e., waits for a response to the ADDRESS ASSIGN PHASE 1 command, by circulating through a loop that contains a timer. This is accomplished by the CRTU 13 testing the bus 15 for a valid ADDRESS ASSIGN PHASE 1 message acknowledgment. If no acknowledgment has been applied to the bus, a timer is tested to determine if it is timed out. If the timer is not timed out, the CRTU 13 again tests the bus 15 to determine if an ADDRESS ASSIGN PHASE 1 message acknowledge has been received. If the timer has timed out, an SEU configuration complete report is generated and displayed on a suitable human readable display device, such as a CRT or a liquid crystal display.

When an ADDRESS ASSIGN PHASE 1 message acknowledge has been received in one of the data word segments, the received SEU data is read and parsed. This data defines the position of the first data word segment that contained the SEU response. Since the data word segments are sequentially checked, by definition, this is the first segment in which response data occurred. Next, as shown in FIG. 4B, another SEU message is built. This message contains the ADDRESS ASSIGN PHASE 2 command. As noted above, the ADDRESS ASSIGN PHASE 2 command message identifies the position of the data word segment that contained the first response to the ADDRESS ASSIGN PHASE 1 command message.

After the ADDRESS ASSIGN PHASE 2 command message has been generated, it is executed, i.e., transmitted to all of the SEUs 17. Thereafter, the CRTU 13 idles while it waits for an ADDRESS ASSIGN PHASE 2 message acknowledgement. As before, this is accomplished by circulating through a loop that contains a timer. First, the bus 15 is tested for an ADDRESS ASSIGN PHASE 2 message acknowledge. If no ADDRESS ASSIGN PHASE 2 message acknowledge is present on the bus, the timer is tested to determine if it has timed out. If the time has not timed out, the CRTU 17 again tests the bus 15 for an ADDRESS ASSIGN PHASE 2 message acknowledge. If the timer has timed out, a process aborted report is produced. Again, this message is visually presented via a suitable display device. The process aborted message is produced because, as discussed above, at least one of the SEUs should have responded to the ADDRESS ASSIGN PHASE 2 command since at least one SEU responded to the ADDRESS ASSIGN PHASE 1 command.

If an ADDRESS ASSIGN PHASE 2 message acknowledge is received before the timer times out, the SEU message is parsed. Then a test is made to determine if the process, i.e., generation of ADDRESS ASSIGN PHASE 2 commands, has been repeated N times. (As noted above N can be fixed number or a variable number. The FIGS. 4A–C diagram assumes that N is fixed.) If the process has not been repeated N times, as described above, another ADDRESS ASSIGN PHASE 2 command message is built and transmitted. If the process has been repeated N times, as shown in FIG. 4C, the parsed SEU data is tested to determine if it is error-free. As well known to those skilled in the art, such a test normally includes a cyclic redundancy check (CRC), a parity check, and a data boundary test. If the SEU communication is not error-free, a process aborted report is produced and displayed. Alternatively, if, as described above, N is variable and dependent on the receipt of an error-free SEU response, the error-free test is performed on each recognized (i.e., first) response to an ADDRESS ASSIGN PHASE 2 command message. In this case an abort would occur only if error responses were still occurring after a large number of PHASE 2 cycles had taken place.

Returning to FIG. 4C, if the last communication from the SEU is error-free, the SEU's address is computed, i.e., the data word segment in which the correct SEU data occurred, is determined. The computed address is stored in an address map. Then, an ADDRESS ASSIGN PHASE 3 command message for the responding SEU is built. As shown in FIG. 3C and discussed above, this message contains an ADDRESS ASSIGN PHASE 3 command plus a configuration address in the data word segment in which the SEU response occurred. After being built, the ADDRESS ASSIGN PHASE 3 command message is executed, i.e., transmitted via the bus 15 to the single responding SEU. Thereafter, the CRTU 13 again idles, i.e., waits for a message from the single responding SEU 17. Again this is accomplished by circulating through a loop that contains a timer. If a valid ADDRESS ASSIGN PHASE 3 acknowledgment message is not received before the timer times out, a process abort report is generated and displayed. If a valid ADDRESS ASSIGN PHASE 3 acknowledgment message is received before the timer times out, the program cycles back to the point where the ADDRESS ASSIGN PHASE 1 command message is built (FIG. 4A).

Thereafter, the entire process is repeated. As noted above, the process ends when no response is received to an ADDRESS ASSIGN PHASE 1 command message. This occurs when addresses have been assigned or created for all SEUs 17.

Figure 5A:
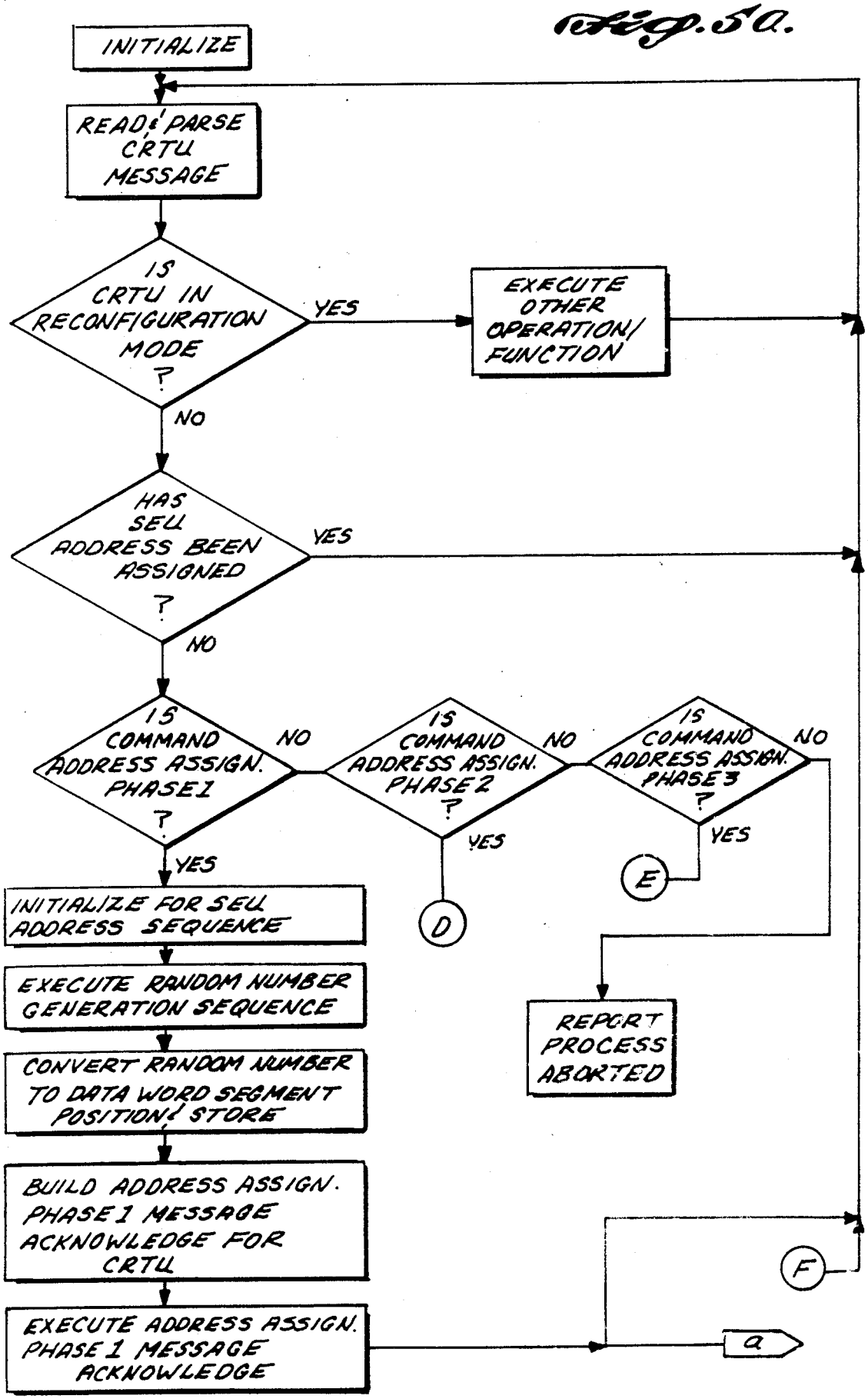
FIGS. 5A-C form a flow diagram illustrating the operation of one of the remote units illustrated in FIG. 1.
Figure 5B:
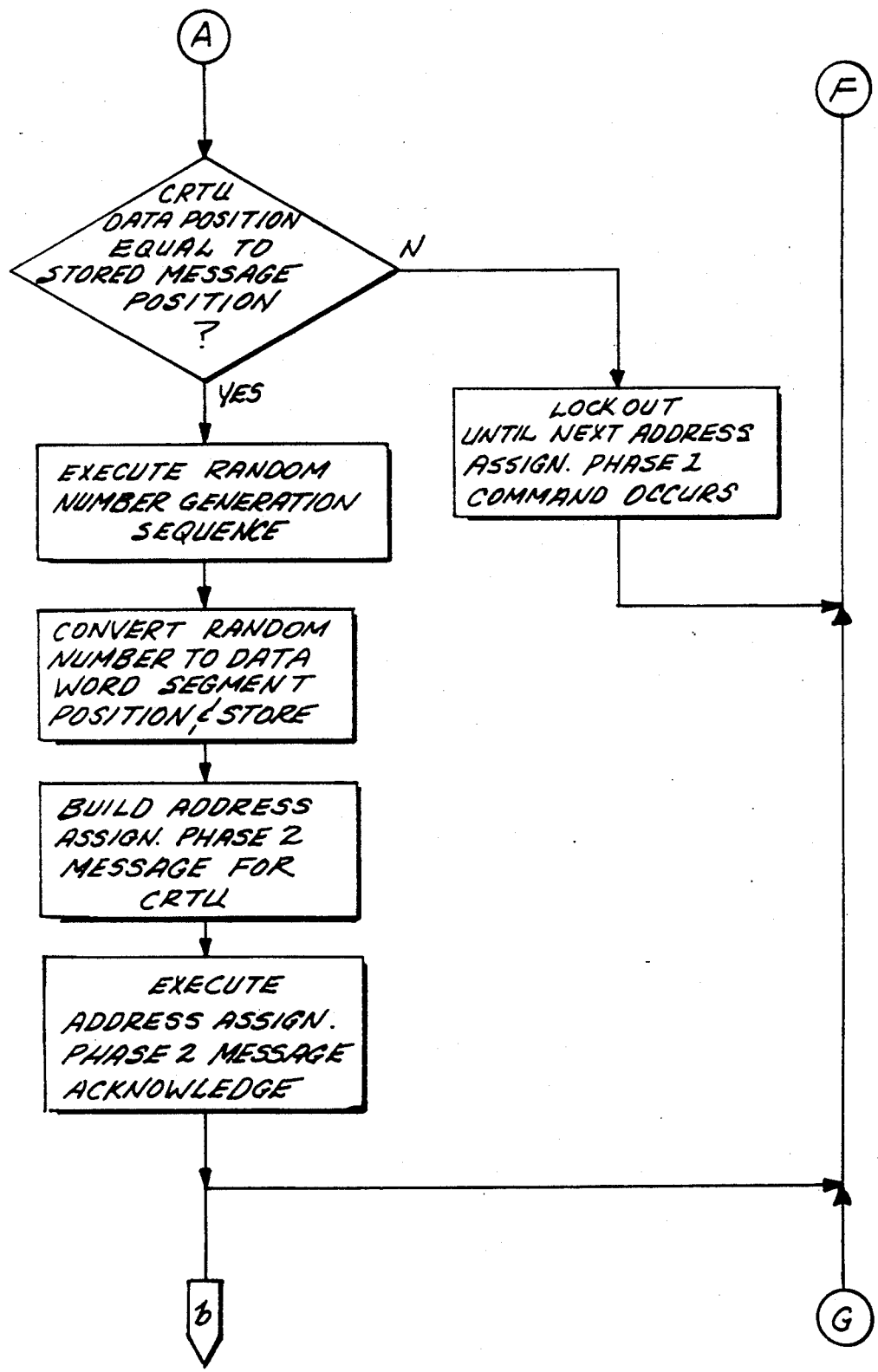
Figure 5C:
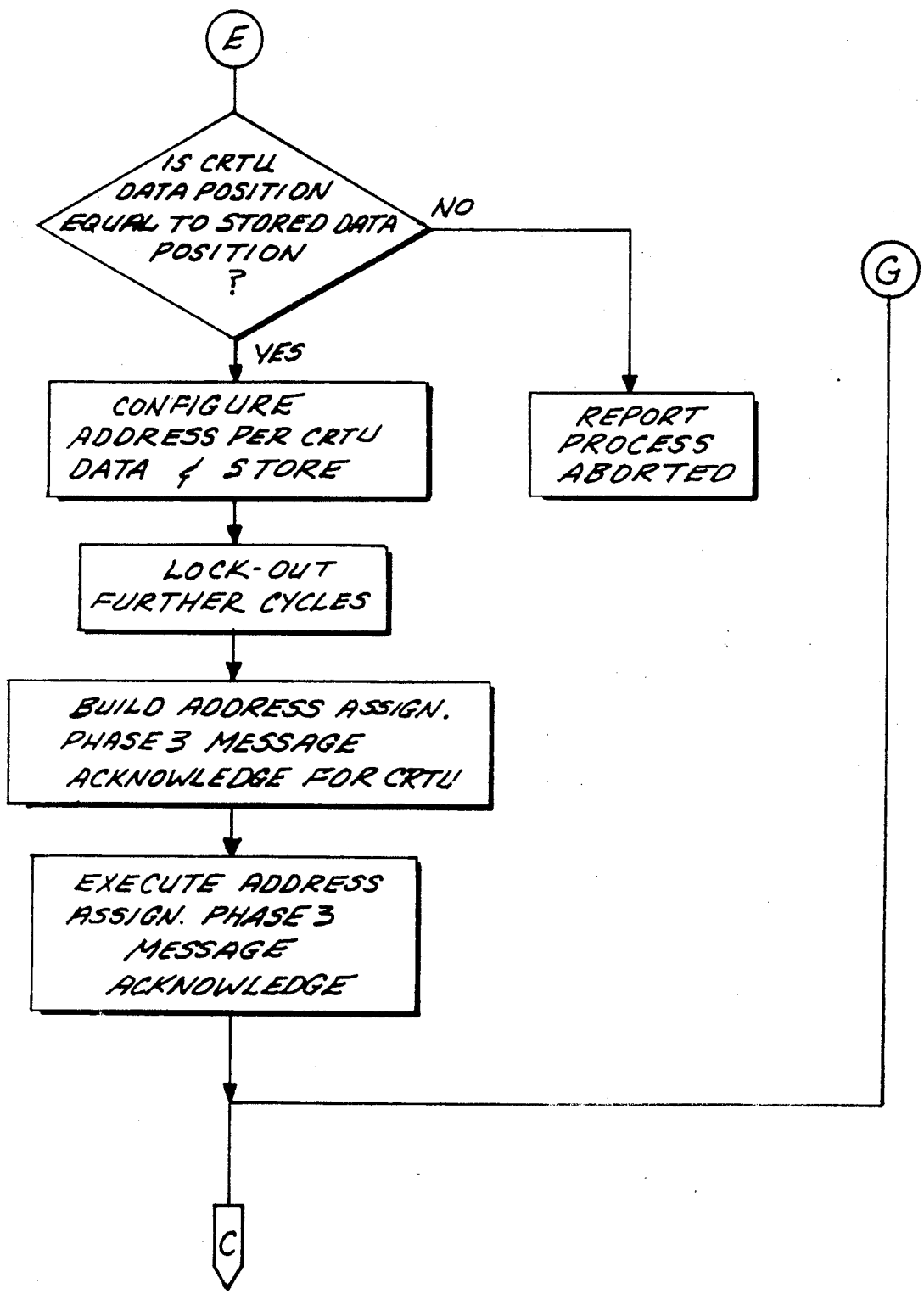

FIGS. 5A–C comprise a flow diagram illustrating the operation of an SEU 17. After being initialized, the SEU 17 waits for a message from the CRTU 13. When a CRTU message that contains a command word is received, the CRTU message is read and parsed. Next, a test is made to determine if the CRTU 13 is in a reconfiguration mode. This is accomplished by determining if the message contains an ADDRESS ASSIGN PHASE 1, PHASE 2, or PHASE 3 command. If the CRTU is not in a reconfiguration mode, the SEU program cycles to a section that responds to other commands and then returns to the point where it waits for another CRTU message that contains a command word.

If the CRTU 13 is in a reconfiguration mode, a test is made to determine if the particular SEU 17 has been assigned an address. If the SEU 17 has been assigned an address, the SEU program cycles to the point where it waits for another CRTU message containing a command word.

If the particular SEU 17 has not been assigned an address, a test is made to determine if the command word is an ADDRESS ASSIGN PHASE 1 command. If the command word is not and ADDRESS ASSIGN PHASE 1 command, a test is made to determine if the command word is an ADDRESS ASSIGN PHASE 2 command. If the command word is not an ADDRESS ASSIGN PHASE 2 command, a test is made to determine if the command word is an ADDRESS ASSIGN PHASE 3 command. If the command word is not an ADDRESS ASSIGN PHASE 3 command, a process abort report is generated and transmitted to the CRTU 13 for display. (If this report is not received by the CRTU 13 in a timely manner, one of the process abort reports shown in FIGS. 4A–C is generated after the related timer has timed out.)

If the command is an ADDRESS ASSIGN PHASE 1 command, the SEU is initialized for an SEU address sequence. Next, a random number generation sequence is executed. It is the random number generation sequence that causes the SEU to randomly "guess" in what data word segment to respond. After the random number generation sequence has been completed, the chosen random number is converted to a data word segment position and the result stored. Then, a CRTU ADDRESS ASSIGN PHASE 1 message acknowledge is built and executed, i.e., transmitted to the CRTU 13 via the data bus 15 in the data word segment position determined by the chosen random number. Thereafter, the SEU program cycles to the point where it waits for a CRTU message containing a command word.

If the command word is an ADDRESS ASSIGN PHASE 2 command, as illustrated in FIG. 5B, a test is made to determine if the ADDRESS ASSIGN PHASE 2 command includes data word segment position information the same as the stored data word segment position determined by the random number chosen in response to the receipt of the ADDRESS ASSIGN PHASE 1 command described above. If the ADDRESS ASSIGN PHASE 2 data word segment position is not the same as the stored data word segment position, the SEU is locked out until the next ADDRESS ASSIGN PHASE 1 command occurs. If the ADDRESS ASSIGN PHASE 2 data word segment position is the same as the stored data word segment position, the random number generation sequence is again executed. The chosen random number is converted to a data word segment position and the result stored. Thereafter, a CRTU ADDRESS ASSIGN PHASE 2 message acknowledge is built and executed, i.e., transmitted to the CRTU via the data bus in the data word segment position determined by the chosen random number. Thereafter, the SEU program cycles to the point where it waits for the next CRTU message containing a command word.

If the command word is an ADDRESS ASSIGN PHASE 3 command, as shown in FIG. 5C, a test is made to determine if the CRTU message data word segment position is equal to the stored data word segment position. If the CRTU message data word segment position is not equal to the stored data word segment position, a process aborted message is sent to the CRTU for display. If the CRTU message data word segment position is equal to the stored data word segment position, the address of the receiving SEU is configured, i.e., set to the configuration address associated with the ADDRESS ASSIGN PHASE 3 command, and stored. Next, the SEU is locked out from further cycles of the program. It is this lockout that causes the SEU to respond positively to the "Has SEU Address Been Assigned?" test (FIG. 5A). Then, the SEU builds and executes an ADDRESS ASSIGN PHASE 3 message acknowledge signal. Thereafter, the SEU cycles to the point where it waits to read and parse the next message from the CRTU containing a command word.

As noted above, in essence, the invention provides a method and apparatus that assigns a unique address in the form of a data word segment position to peripheral or remote units, such as an SEU, that needs to communicate with a central unit, such as a CRTU. The automatic nature of the method and apparatus allows the remote unit addresses to be automatically changed, i.e., reconfigured, in a transparent manner at any time it is desirable to do so. This can be done when new remote units are added to, or unneeded remote units are removed from, the overall network. It can also be done when remote units are rearranged to meet some particular objective, such as rearranging the seats of an aircraft. Because the assignment of addresses, i.e., data word segments, is transparent to the network, the program can be run periodically without requiring operator initiation, if desired.

While a preferred embodiment of the invention has been illustrated and described, it is to be understood that within the scope of the appended claims, various changes can be made.

The embodiments of the invention in which an exclusive property or privilege is claimed are defined as follows:

1. A pseudorandom, iterative method of assigning addresses to a plurality of remote units coupled to a central unit via a communication medium for communication via messages comprising frames that include a series of data word segment positions, said method comprising the steps of:

transmitting from said central unit to said remote units a first message;

transmitting from said remote units to said central unit a response to said first message, said response being randomly located in one of said data word segment positions;

transmitting from said central unit to said remote units a second message, said second message containing data that identifies one and only one data word segment position that contained a remote unit response to said first message;

transmitting only from said remote units that responded to said first message in said one and only one data word segment position identified in said second message a response to said second message, said response being randomly located in one of said data word segment positions;

sequentially repeating a number of times the transmission of said second message from said central unit to said remote unit, each of said repeated second messages containing data that identifies one and only one data word segment position that contained a remote unit response to the immediately preceding second message;

sequentially transmitting only from said remote units that responded to a second message in the data word segment position identified in a retransmitted second message a response to said second messages, said responses being randomly located in one of said data word segment positions;

after said second message has been repeated said predetermined number of times, transmitting from said central unit to said remote units a third message, said third message containing data that identifies one and only one data word segment position that contained a response to the last one of said repeated second messages and remote unit address data;

transmitting only from the remote unit that responded to said last one of said repeated second messages a response to said third message if said one and only one data word segment position identified in said third message corresponds to the data word segment position in which said remote unit responded to said last one of said repeated second messages; and repeating said steps until none of said remote units responds to a first message.

2. A pseudorandom, iterative method of assigning addresses as claimed in claim 1, wherein:

said message frames also include a command word segment;

said first message includes a first command word, said second message includes a second command word, and said third message includes a third command word; and the response by said remote units is dependent upon the nature of said first, second, and third command words.

3. A pseudorandom, iterative method of assigning addresses as claimed in claim 2, wherein said predetermined number of repetitions of said second message is fixed.

4. A pseudorandom, iterative method of assigning addresses as claimed in claim 2, wherein said predetermined number of repetitions of said second message is determined by said central unit evaluating the responses to said second messages received from said remote units and terminating said repetitions when said central unit receives a response from a single remote unit in one of said data word segment positions.

5. A pseudorandom, iterative method of assigning addresses as claimed in claims 1, 2, 3 or 4, including the step of locking out said remote units from responding to said second messages transmitted by said central unit when the one and only one data word segment position identified in a second message does not correspond to the data word segment position in which a remote unit responded to the immediately preceding second message.

6. A pseudorandom, iterative method of assigning addresses as claimed in claim 1, wherein said predetermined number of repetitions of said second message is fixed.

7. A pseudorandom, iterative method of assigning addresses as claimed in claim 1, wherein said predetermined number of repetitions of said second message is determined by said central unit evaluating the responses to said second messages received from said remote units and terminating said repetitions when said central unit receives a response from a single remote unit in one of said data word segment positions.

8. A pseudorandom, iterative method of assigning addresses as claimed in claims 6 or 7, including the step of locking out said remote units from responding to said second messages transmitted by said central unit when the one and only one data word segment position identified in a second message does not correspond to the data word segment position in which a remote unit responded to the immediately preceding second message.

9. In a network comprising a plurality of remote units coupled to a central unit via a communication medium for communication therebetween via messages comprising frames that include a series of data word segment positions, the improvement comprising apparatus for controlling the assigning addresses to said remote units by causing:

said central unit to transmit a first message to said remote units;

said remote units to transmit to said central unit a response to said first message, said responses being randomly located in one of said data word segment positions;

said central unit to transmit to said remote units a second message, said second message containing data that identifies one and only one data word segment position that contains a remote unit response to said first message;

only said remote units that responded to said first message in said one and only one data word segment position identified in said second message to transmit to said central unit a response to said second message, said responses being randomly located in one of said data word segment positions;

said central unit to transmit said second message a predetermined number of times to said remote units, each of said repeated second messages containing data that identifies one and only one of said data word segment positions that contained a response to the immediately preceding second message;

only said remote units that responded to a second message in the data word segment position identified in a retransmitted second message to transmit to said central unit a response to said second messages, said responses being randomly located in one of said data word segment positions;

said central unit to transmit to said remote units after said second message has been repeated said predetermined number of times a third message, said third message containing data that identifies one and only one data word segment position that contained a response to the last one of said repeated second messages and remote unit address data;

said remote unit that responded to said last one of said repeated second messages to transmit a response to said third message if said one and only said data word segment position identified in said third message corresponds to the data word segment position in which said remote unit responded to said last one of said repeated messages; and said central unit and said remote units to repeat said transmissions until said remote units do not respond to a first message transmitted by said central unit.

10. The improvement claimed in claim 9, wherein:

said message frames also include a command word segment;

said first message includes a first command word, said second message includes a second command word, and said third message includes a third command word; and the response by said remote units is dependent upon the nature of said first, second, and third command words.

11. The improvement claimed in claim 10, wherein said predetermined number of repetitions of said second message is fixed.

12. The improvement claimed in claim 10, wherein said predetermined number of repetitions of said second message is determined by said central unit evaluating the responses to said second messages received from said remote units and terminating said repetitions when said central unit receives a response from a single remote unit in one of said data word segment positions.

13. The improvement claimed in claims 9, 10, 11 or 12, including the step of locking out said remote units from responding to said second messages transmitted by said central unit when the one and only one data word segment position identified in a second message does not correspond to the data word segment position in which a remote unit responded to the immediately preceding second message.

14. The improvement claimed in claim 9, wherein said predetermined number of repetitions of said second message is fixed.

15. The improvement claimed in claim 9, wherein said predetermined number of repetitions of said second message is determined by said central unit evaluating the responses to said second messages received from said remote units and terminating said repetitions when said central unit receives a response from a single remote unit in one of said data word segment positions.

16. The improvement claimed in claims 14 or 15, including the step of locking out said remote units from responding to said second messages transmitted by said central unit when the one and only one data word segment position identified in a second message does not correspond to the data word segment position in which a remote unit responded to the immediately preceding second message.

* * * * *

UNITED STATES PATENT AND TRADEMARK OFFICE
CERTIFICATE OF CORRECTION

PATENT NO. : 5,029,209
DATED : July 2, 1991
INVENTOR(S) : Fredrick S. Stong, Jr. et al.

It is certified that error appears in the above-identified patent and that said Letters Patent is hereby corrected as shown below:

ON THE TITLE PAGE:
Under item [19], "Strong, Jr. et al" should read --Stong, Jr. et al--.

In item [75]   "Fredrick S. Strong, Jr.," should read --Fredrick S. Stong, Jr.,--

Signed and Sealed this

Sixteenth Day of March, 1993

Attest:

STEPHEN G. KUNIN

*Attesting Officer*   *Acting Commissioner of Patents and Trademarks*